United States Patent
Wang et al.

(10) Patent No.: US 10,708,762 B2
(45) Date of Patent: Jul. 7, 2020

(54) METHOD AND APPARATUS FOR VIRTUALIZING SIM CARD, TERMINAL AND NETWORK SIDE DEVICE

(71) Applicant: SPREADTRUM COMMUNICATIONS (SHANGHAI) CO., LTD., Zhangjiang, Shanghai (CN)

(72) Inventors: Xupeng Wang, Shanghai (CN); Huawei Zhang, Shanghai (CN); Canguo Wang, Shanghai (CN); Ping Jiang, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 15/800,610

(22) Filed: Nov. 1, 2017

(65) Prior Publication Data

US 2018/0192281 A1 Jul. 5, 2018

(30) Foreign Application Priority Data

Dec. 30, 2016 (CN) .......................... 2016 1 1255436

(51) Int. Cl.
*H04B 1/38* (2015.01)
*H04W 8/20* (2009.01)

(52) U.S. Cl.
CPC .................................... *H04W 8/20* (2013.01)

(58) Field of Classification Search
CPC ...................................................... H04W 8/20
USPC ................................................. 455/558, 557
See application file for complete search history.

(56) References Cited

U.S. PATENT DOCUMENTS

| | | | | |
|---|---|---|---|---|
| 2003/0211840 A1* | 11/2003 | Castrogiovanni | ... | H04M 15/745 455/405 |
| 2004/0042442 A1* | 3/2004 | Pecen | ... | H04W 12/04 370/352 |
| 2012/0208532 A1* | 8/2012 | Liu | ... | H04W 12/06 455/432.1 |
| 2015/0215773 A1* | 7/2015 | Bai | ... | H04M 17/103 455/418 |
| 2016/0255531 A1* | 9/2016 | Stein | ... | G06F 1/1632 455/575.1 |
| 2017/0272933 A1* | 9/2017 | Zhao | ... | H04L 63/0876 |
| 2017/0353939 A1* | 12/2017 | Behera | ... | H04W 76/18 |
| 2017/0359762 A1* | 12/2017 | Yoo | ... | H04W 76/30 |
| 2018/0041893 A1* | 2/2018 | Guo | ... | H04W 8/205 |
| 2018/0041897 A1* | 2/2018 | Prasad | ... | H04W 4/50 |
| 2018/0070298 A1* | 3/2018 | Kothari | ... | H04W 48/18 |
| 2018/0109942 A1* | 4/2018 | Lipovkov | ... | H04B 1/3816 |

FOREIGN PATENT DOCUMENTS

CN 105959932 A * 9/2016

* cited by examiner

*Primary Examiner* — Edward F Urban
*Assistant Examiner* — Max Mathew
(74) *Attorney, Agent, or Firm* — Cantor Colburn LLP

(57) ABSTRACT

A method and an apparatus for virtualizing a SIM card, a terminal and a network side device are provided in the present disclosure. The method includes: receiving a request for accessing to SIM card data; and accessing SIM card data on a remote end according to the request for accessing to SIM card data. The method, the apparatus, the terminal and the network side device in the present disclosure are simple in implementation and have a low cost.

12 Claims, 2 Drawing Sheets apparatus for virtualizing a SIM card

METHOD AND APPARATUS FOR VIRTUALIZING SIM CARD, TERMINAL AND NETWORK SIDE DEVICE

CROSS-REFERENCE TO RELATED APPLICATIONS

This application claims the benefit of priority under 35 U.S.C. § 119 to Chinese Patent Application No. 201611255436.0, filed on Dec. 30, 2016, the entire disclosure of which are incorporated herein by reference.

TECHNICAL FIELD

The present disclosure relates to a communication technology field, and more particularly, to a method and an apparatus for virtualizing a SIM card, a terminal and a network side device.

BACKGROUND

Subscriber Identification Module (SIM) card is a chip that stores a digital mobile phone user's information, encryption keys and the user's phone book, which can be applied to identification of Global System for Mobile communication (GSM) network users and encryption of voice information during a call. The conventional SIM cards need to be purchased in an operator and need to be put into a phone after accessing a network. With the development of mobile communication technology, most users have multiple cards, and when the users use a different card during a business trip or a travel, they need to replace the SIM card by themselves. Nowadays, there are manufacturers who have developed a virtual SIM card which is different from the conventional SIM cards, and implementation of the virtual SIM card needs cooperation of SIM card manufacturers, operators and terminal manufacturers.

The inventors have found that, there are at least the following technical problems in a conventional technology.

The existing virtual SIM cards are costly and require cooperation of SIM card manufacturers, operators and terminal manufacturers etc, which makes implementation of the virtual SIM cards complicated.

SUMMARY

A method and an apparatus for virtualizing a SIM card, a terminal and a network side device provided in the present disclosure are simple in implementation and have a low cost.

A method for virtualizing a SIM card is provided in the present disclosure. The method includes: receiving a request for accessing to SIM card data; and accessing SIM card data on a remote end according to the request for accessing to SIM card data.

Optionally, the method further includes obtaining the SIM card data from the remote end; storing the obtained SIM card data; and accessing the stored SIM card data in accordance with the request for accessing to SIM card data, when the request for accessing to SIM card data is received.

Optionally, the method further includes transmitting a data exchange request to the remote end; and receiving information returned by the remote end.

Optionally, the method further includes decrypting the obtained SIM card data and encrypting SIM card data to be written during accessing the stored SIM card data.

Optionally, the method further includes switching SIM card data corresponding to a plurality of SIM cards on the remote end according to a user's request for switching SIM cards, or switching the SIM card data corresponding to a plurality of SIM cards that are stored according to the user's request for switching SIM cards.

A method for virtualizing a SIM card applied to a network side is also provided in the present disclosure. The method includes receiving a request for accessing to SIM card data, and returning corresponding SIM card data according to the request for accessing to SIM card data.

An apparatus for virtualizing a SIM card is also provided in the present disclosure. The apparatus includes a SIM card management circuitry, configured to receive a request for accessing to SIM card data, and to access SIM card data on a remote end according to the request for accessing to SIM card data.

Optionally, the SIM card management circuitry is configured to obtain SIM card data from a remote end; and the apparatus further includes a SIM card data storage circuitry, configured to store the SIM card data obtained by the SIM card management circuitry; and the SIM card management circuitry is further configured to access the SIM card data stored in the SIM card data storage circuitry in accordance with the request for accessing to SIM card data, when the SIM card management circuitry receives the request for accessing to SIM card data.

Optionally, the SIM card management circuitry is further configured to exchange data with a SIM card pool on the remote end according to a data exchange request and to receive information returned by the remote end, when the SIM card management circuitry receives the data exchange request.

Optionally, the apparatus further includes a data encryption and decryption circuitry, which is configured to decrypt the SIM card data stored in the SIM card data storage circuitry, and to encrypt SIM card data sent to the SIM card data storage circuitry, during the SIM card management circuitry accessing the SIM card data stored in the SIM card data storage circuitry.

Optionally, the apparatus further includes a SIM card data switching circuitry, configured to switch SIM card data corresponding to a plurality of SIM cards on the remote end via the SIM card management circuitry according to a user's request for switching SIM cards, or to switch the SIM card data corresponding to a plurality of SIM cards stored in the SIM card data storage circuitry according to the user's request for switching SIM cards.

An apparatus for virtualizing a SIM card which is located in a network side is also provided in the present disclosure. The apparatus includes a SIM card pool data storage circuitry, configured to store SIM cards or SIM card configuration; and a SIM card pool management circuitry, configured to receive a request for accessing to SIM card data, to obtain SIM card data from the SIM card pool data storage circuitry and to return corresponding SIM card data according to the request for accessing to SIM card data.

A terminal is also provided according to an embodiment. The terminal includes an apparatus for virtualizing a SIM card, where the apparatus for virtualizing a SIM card includes a SIM card management circuitry, configured to receive a request for accessing to SIM card data, and to access SIM card data on a remote end according to the request for accessing to SIM card data.

A terminal is also provided according to another embodiment. The terminal includes an apparatus for virtualizing a SIM card, and the apparatus for virtualizing a SIM card includes a SIM card management circuitry, configured to receive a request for accessing to SIM card data, and to access SIM card data on a remote end according to the request for accessing to SIM card data; where the SIM card management circuitry is configured to obtain SIM card data from a remote end; and the apparatus further includes: a SIM card data storage circuitry, configured to store the SIM card data obtained by the SIM card management circuitry; and the SIM card management circuitry is further configured to access the SIM card data stored in the SIM card data storage circuitry in accordance with the request for accessing to SIM card data, when the SIM card management circuitry receives the request for accessing to SIM card data.

A network side device is also according to an embodiment. The network side device includes an apparatus for virtualizing a SIM card located in a network side, where the apparatus for virtualizing a SIM card includes: a SIM card pool data storage circuitry, configured to store SIM cards or SIM card configuration; and a SIM card pool management circuitry, configured to receive a request for accessing to SIM card data, to obtain SIM card data from the SIM card pool data storage circuitry and to return corresponding SIM card data according to the request for accessing to SIM card data.

In the method for virtualizing a SIM card in the present disclosure, the request for accessing to SIM card data is received, and the SIM card data on the remote end is accessed according to the request for accessing to SIM card data. Compared with a conventional technology, it does not need to install a SIM card in a terminal, and when the SIM card data needs to be accessed, the SIM card data can be obtained directly from the remote end, which can simplify virtualization of the SIM card and reduce the cost.

DETAILED DESCRIPTION

In order to make the above-mentioned objects, features and advantages of the present disclosure more easily understood, specific embodiments of the present disclosure will be described in detail with reference to the accompanying drawings below. Apparently, embodiments described below are merely a portion of embodiments of the present disclosure, and are not all embodiments. All other embodiments obtained by those of ordinary skill in the art without making creative work are within the scope of the present disclosure, based on embodiments disclosed hereinafter.

Figure 1:
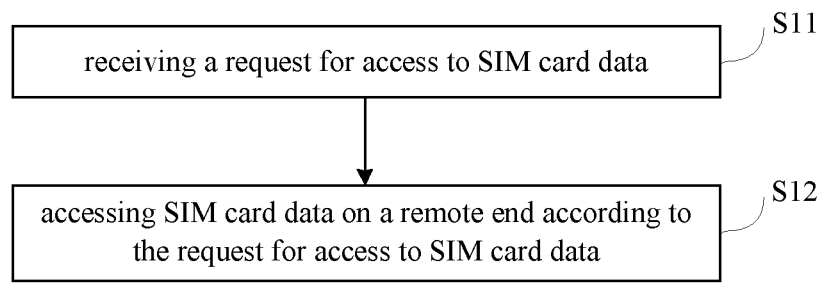
FIG. 1 schematically illustrates a flow chart of a method for virtualizing a SIM card according to an embodiment of the present disclosure.

A method for virtualizing a SIM card is provided in the present disclosure. Referring to FIG. 1, FIG. 1 schematically illustrates a flow chart of a method for virtualizing a SIM card according to an embodiment. The method includes S11 and S12.

In S11, a request for accessing to SIM card data is received.

In S12, SIM card data on a remote end is accessed according to the request for accessing to SIM card data.

In the method for virtualizing a SIM card in the present disclosure, the request for accessing to SIM card data is received, and the SIM card data on the remote end is accessed according to the request for accessing to SIM card data. Compared with a conventional technology, it does not need to install a SIM card in a terminal, and when the SIM card data needs to be accessed, the SIM card data can be obtained directly from the remote end, therefore virtualization of the SIM card can be simplified and the cost can be reduced in the present disclosure.

In some embodiments, the method for virtualizing a SIM card may further include: obtaining the SIM card data from the remote end; storing the obtained SIM card data; and accessing the stored SIM card data in accordance with the request for accessing to SIM card data, when the request for accessing to SIM card data is received.

In some embodiments, the method for virtualizing a SIM card may further include: transmitting a data exchange request to the remote end; and receiving information returned by the remote end.

In some embodiments, the method for virtualizing a SIM card may further include: decrypting the obtained SIM card data and encrypting SIM card data to be written during accessing the stored SIM card data.

In some embodiments, the method for virtualizing a SIM card may further include: switching SIM card data corresponding to a plurality of SIM cards on the remote end according to a user's request for switching SIM cards, or switching the SIM card data corresponding to a plurality of SIM cards that are stored according to the user's request for switching SIM cards.

Figure 2:
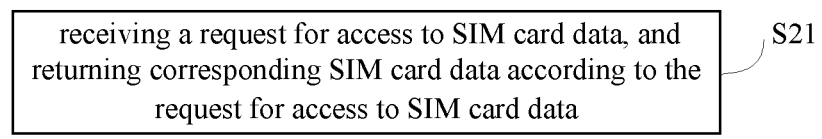
FIG. 2 schematically illustrates a flow chart of a method for virtualizing a SIM card according to another embodiment of the present disclosure.

A method for virtualizing a SIM card which is applied to a network side is provided according to embodiments of the present disclosure. Referring to FIG. 2, FIG. 2 schematically illustrates a flow chart of a method for virtualizing a SIM card according to another embodiment. The method includes S21.

In S21, a request for accessing to SIM card data is received, and corresponding SIM card data is returned according to the request for accessing to SIM card data.

In the method for virtualizing a SIM card in the present disclosure, a request for accessing to SIM card data is received, and corresponding SIM card data is returned according to the request for accessing to SIM card data. Compared with a conventional technology, it does not need to install a SIM card in a terminal, when the SIM card data needs to be accessed, the SIM card data can be obtained directly from the remote end, therefore virtualization of the SIM card can be simplified and the cost can be reduced in the present disclosure.

Figure 3:
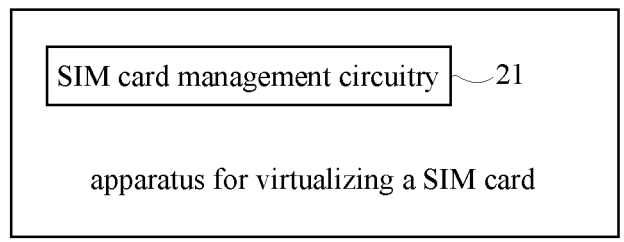
FIG. 3 schematically illustrates a structural diagram of an apparatus for virtualizing a SIM card according to an embodiment of the present disclosure.

An apparatus for virtualizing a SIM card is also provided according to embodiments of the present disclosure. Referring to FIG. 3, FIG. 3 schematically illustrates a structural diagram of an apparatus for virtualizing a SIM card according to an embodiment. The apparatus may include a SIM card management circuitry 31 which is configured to receive a request for accessing to SIM card data, and to access SIM card data on a remote end according to the request for accessing to SIM card data.

In the apparatus for virtualizing a SIM card in the present disclosure, the SIM card management circuitry 31 receives the request for accessing to SIM card data, and accesses SIM card data on the remote end according to the request for accessing to SIM card data. Compared with a conventional technology, it does not need to install a SIM card in a terminal, when the SIM card data needs to be accessed, the SIM card data can be obtained directly from the remote end, therefore virtualization of the SIM card can be simplified and the cost can be reduced in the present disclosure.

Specifically, the SIM card data may include user-related data, keys and security algorithm etc.

Further, the SIM card data on the remote end may be a SIM card entity or a SIM profile, and the SIM card data on the remote end may be placed in a network side server with SIM card pool management function. The SIM card management circuitry 31 of a terminal may be connected with the SIM card pool through infrared, Bluetooth, wireless network, local area network or wide area network, or other data transmission manners, and interact with the SIM card data in the network side server through bearers corresponding to the different data transmission manners.

In some embodiments, the SIM card management circuitry is further configured to exchange data with a SIM card pool on the remote end according to a data exchange request and to receive information returned by the remote end, when the SIM card management circuitry receives the data exchange request.

Specifically, the data exchange request may be an authentication request and so on. When the authentication is required, the SIM card management circuitry 31 may make an authentication request to the SIM card pool through wireless transmission such as infrared, Bluetooth, wireless network, local area network or wide area network etc., and a SIM card pool management circuitry 52 (referring to FIG. 5) may activate designated SIM card data stored in a SIM card pool data storage circuitry 51 that is currently connected with after receiving the authentication request and return the authentication information, and then the SIM card management circuitry 31 receives the returned authentication information and completes the authentication process.

Figure 4:
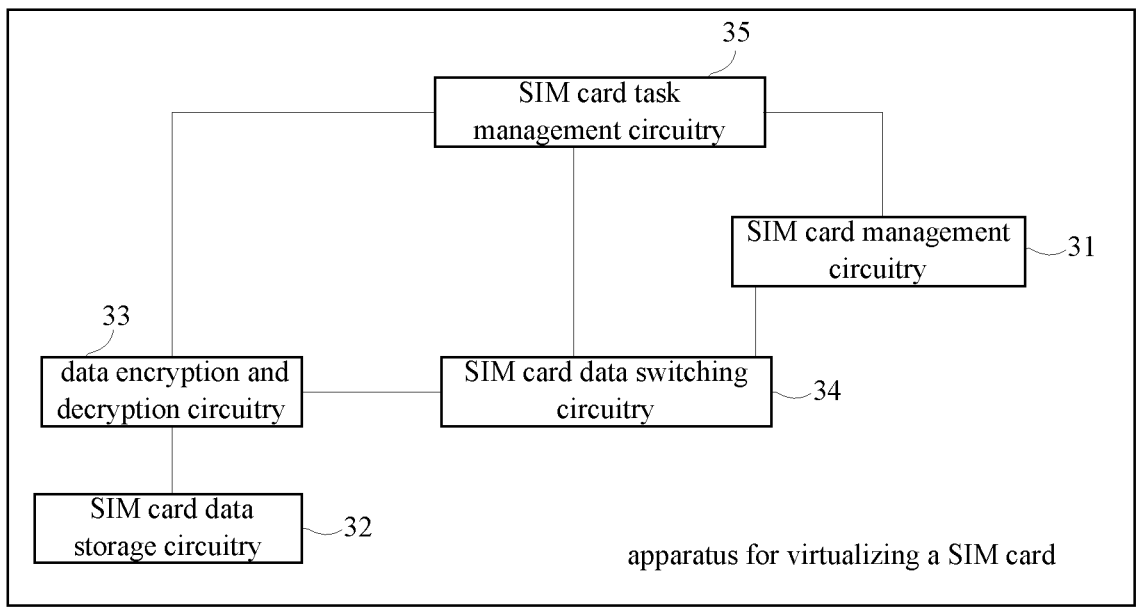
FIG. 4 schematically illustrates a structural diagram of an apparatus for virtualizing a SIM card according to another embodiment of the present disclosure.

Referring to FIG. 4, FIG. 4 schematically illustrates a structural diagram of an apparatus for virtualizing a SIM card according to another embodiment. The apparatus includes: a SIM card management circuitry 31 which is configured to obtain SIM card data from a remote end; and a SIM card data storage circuitry 32 which is configured to store the SIM card data obtained by the SIM card management circuitry; and the SIM card management circuitry 31 is further configured to access the SIM card data stored in the SIM card data storage circuitry 32 in accordance with the request for accessing to SIM card data, when the SIM card management circuitry 31 receives the request for accessing to SIM card data.

Referring to FIG. 4, in some embodiments, the apparatus may further include a data encryption and decryption circuitry 33 which is configured to decrypt the SIM card data stored in the SIM card data storage circuitry 32, and to encrypt SIM card data sent to the SIM card data storage circuitry 32, during the SIM card management circuitry 31 accessing the SIM card data stored in the SIM card data storage circuitry 32.

Specifically, since the keys and the security algorithm in the SIM card data are sensitive data for user security, the data encryption and decryption circuitry 33 is applied to encrypt or decrypt any data interaction with the SIM card management circuitry 31, so as to ensure that the space where the data is stored cannot be stolen.

In some embodiments, referring to FIG. 4, the apparatus may further include a SIM card data switching circuitry 34, which is configured to switch SIM card data corresponding to a plurality of SIM cards on the remote end via the SIM card management circuitry 31 according to a user's request for switching SIM cards, or to switch the SIM card data corresponding to a plurality of SIM cards stored in the SIM card data storage circuitry 32 according to the user's request for switching SIM cards.

Figure 5:
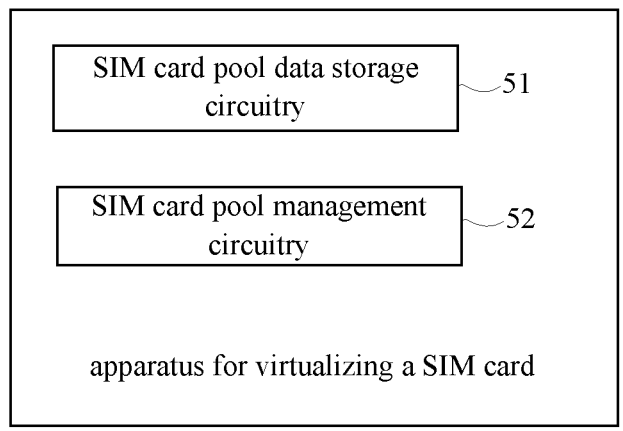
FIG. 5 schematically illustrates a structural diagram of an apparatus for virtualizing a SIM card according to another embodiment of the present disclosure.

In some embodiments, an apparatus for virtualizing a SIM card which is located in a network side is also provided in the present disclosure. Referring to FIG. 5, FIG. 5 schematically illustrates a structural diagram of an apparatus for virtualizing a SIM card according to another embodiment, the apparatus may include: a SIM card pool data storage circuitry 51 configured to store SIM cards or SIM card configuration; and a SIM card pool management circuitry 52 configured to receive a request for accessing to SIM card data, to obtain SIM card data from the SIM card pool data storage circuitry and to return corresponding SIM card data according to the request for accessing to SIM card data.

Hereinafter, the aforementioned apparatus will be described in detail with reference to specific embodiments.

In a first step, a SIM card task management circuitry 35 makes a request to the SIM card management circuitry 31 to obtain SIM card data from a remote end through the SIM card management circuitry 31.

The obtained SIM card data is the same as data in the current SIM entity, which includes configuration information, keys and security algorithm and so on.

Specifically, the user may request to obtain the SIM card data from the remote end, and an upper layer circuitry notifies the SIM card management circuitry 31 through the SIM card task management circuitry 35; the SIM card task management circuitry 35 receives the notification, and connects with the SIM card pool management circuitry 52 via infrared, Bluetooth, wireless network, local area network or wide area network etc. to obtain the SIM card data, and returns the SIM card data to the SIM card task management circuitry 35; and the SIM card task management circuitry 35 informs the user of successful obtaining the SIM card data through the upper layer circuitry.

In a second step, the obtained SIM card data is transmitted to the data encryption and decryption circuitry 33 through the SIM card management circuitry 31 and the SIM card task management circuitry 35, and the data encryption and decryption circuitry 33 stores the SIM card data in the SIM card data storage circuitry 32 after processing the SIM card data.

The storing process needs to be carried out by the data encryption and decryption circuitry 33, and any request that requires data exchange with the SIM card data storage circuitry 32 needs to pass through the data encryption and decryption circuitry 33.

In a third step, the SIM card data and configuration stored in the SIM card data storage circuitry 32 are used for a call.

Hereinafter, the above-described apparatus will be described in detail with reference to specific embodiments.

In one embodiment, the user requests to switch the SIM card from SIM card data 1 to SIM card data 2 according to a remote data.

In a first step, an upper circuitry notifies the SIM card data switching circuitry 34 to switch from the SIM card data 1 to the SIM card data 2 through the SIM task management circuitry 35 according to the user request.

In a second step, after receiving the request, the SIM card data switching circuitry 34 interacts with the SIM card pool management circuitry 52 at a remote end through the SIM card management circuitry 31 to request switching the SIM card, then the remote end disconnects the terminal from the SIM card data 1 and establishes a connection of the terminal with the SIM card data 2.

Specifically, after receiving the switching request, the SIM card pool management circuitry 52 deactivates the SIM card data 1 in the SIM card pool data storage circuitry 51 that is connected, and activates the SIM card data 2 in the SIM card pool data storage circuitry 51 according to the request, and then informs the SIM card management circuitry 31 that the switching is completed through infrared, Bluetooth, wireless network, local area network or wide area network and so on.

In a third step, the SIM card data switching circuitry 34 receives the SIM card switching completion information through the SIM card management circuitry 31 and reloads the SIM card data at the local end.

In another embodiment, the user requests to switch the SIM card from SIM card data 2 to SIM card data 3 according to the SIM card data stored in the local SIM card data storage circuitry 32.

In a first step, an upper circuitry notifies the SIM card data switching circuitry 34 to switch from the SIM card data 2 to the SIM card data 3 through the SIM task management circuitry 35 according to the user request.

In a second step, the SIM card data switching circuitry 34 receives the request, and notifies the SIM card data storage circuitry 32 to deactivate the SIM card data 2 through the data encryption and decryption circuitry 33.

In a third step, the data encryption and decryption circuitry 33 is disconnected from the SIM card data 2 in the SIM card data switching circuitry 34.

In a fourth step, the data encryption and decryption circuitry 33 is connected with the SIM card data 3 in the SIM card data switching circuitry 34.

In a fifth step, the switching completion information is returned by the SIM card data switching circuitry 34.

A terminal including the aforementioned apparatus for virtualizing a SIM card is also provided according to an embodiment of the present disclosure. The terminal includes an apparatus for virtualizing a SIM card, where the apparatus for virtualizing a SIM card includes a SIM card management circuitry, configured to receive a request for accessing to SIM card data, and to access SIM card data on a remote end according to the request for accessing to SIM card data.

A terminal is also provided according to another embodiment. The terminal includes an apparatus for virtualizing a SIM card, and the apparatus for virtualizing a SIM card includes a SIM card management circuitry, configured to receive a request for accessing to SIM card data, and to access SIM card data on a remote end according to the request for accessing to SIM card data; where the SIM card management circuitry is configured to obtain SIM card data from a remote end; and the apparatus further includes: a SIM card data storage circuitry, configured to store the SIM card data obtained by the SIM card management circuitry; and the SIM card management circuitry is further configured to access the SIM card data stored in the SIM card data storage circuitry in accordance with the request for accessing to SIM card data, when the SIM card management circuitry receives the request for accessing to SIM card data.

A network side device is also provided according to embodiments of the present disclosure. The network side device includes the aforementioned apparatus for virtualizing a SIM card located in a network side, where the apparatus for virtualizing a SIM card includes: a SIM card pool data storage circuitry, configured to store SIM cards or SIM card configuration; and a SIM card pool management circuitry, configured to receive a request for accessing to SIM card data, to obtain SIM card data from the SIM card pool data storage circuitry and to return corresponding SIM card data according to the request for accessing to SIM card data.

It will be appreciated by those of ordinary skill in the art that all or a portion of the steps in the various methods of the embodiments described above may be performed by a program that instructs the associated hardware to be stored in a computer-readable storage medium which may include: ROM, RAM, magnetic disk, or optical disk.

Although the present disclosure has been described above, the present disclosure is not limited thereto. It should be understood by those skilled in the art that various changes and modifications may be made without departing from the spirit and scope of the disclosure, and therefore, the scope of the disclosure should be limited by the scope of the claims.

The invention claimed is:

1. A method for virtualizing a SIM card, applied to a terminal, comprising:
   receiving a request for accessing to SIM card data; and
   accessing SIM card data on a remote end according to the request for accessing to SIM card data;
   wherein the method further comprises:
   disconnecting a connection between a first SIM card data and the terminal in response to a user's request for switching SIM card data from the first SIM card data to a second SIM card data; and
   connecting the second SIM card data to the terminal;
   wherein the connection is established through infrared, Bluetooth, a wireless network, a local area network or a wide area network.

2. The method according to claim 1, further comprising:
   obtaining the SIM card data from the remote end;
   storing the obtained SIM card data; and
   accessing the stored SIM card data in accordance with the request for accessing to SIM card data, when the request for accessing to SIM card data is received.

3. The method according to claim 1, further comprising:
   transmitting a data exchange request to the remote end; and
   receiving information returned by the remote end.

4. The method according to claim 2, further comprising:
   decrypting the obtained SIM card data and encrypting SIM card data to be written during accessing the stored SIM card data.

5. A method for virtualizing a SIM card, applied to a network side, comprising:
   receiving a request of a terminal for accessing to SIM card data, and returning the SIM card data stored in the network side according to the request for accessing to SIM card data;
   wherein the method further comprises:
   disconnecting a connection between a first SIM card data and the terminal in response to a user's request for switching SIM card data from the first SIM card data to a second SIM card data; and
   connecting the second SIM card data to the terminal;
   wherein the connection is established through infrared, Bluetooth, a wireless network, a local area network or a wide area network.

6. The method according to claim 5, further comprising:
   deactivating the first SIM card data stored in the network side that is currently connected with the terminal and activating the second SIM card data stored in the network side, so as to disconnect the terminal from the first SIM card data and to establish the connection of the terminal with the second SIM card data.

7. An apparatus for virtualizing a SIM card, located in a terminal, comprising:
   a SIM card management circuitry, configured to receive a request for accessing to SIM card data, and to access SIM card data on a remote end according to the request for accessing to SIM card data;
   wherein the SIM card management circuitry is configured to obtain the SIM card data on the remote end;
   the apparatus further comprises: a SIM card data storage circuitry, configured to store the SIM card data obtained by the SIM card management circuitry;
   wherein the apparatus further comprises a SIM card data switching circuitry, configured to:
   disconnect a connection between a first SIM card data and the terminal in response to a user's request for switching SIM card data from the first SIM card data to a second SIM card data; and
   connect the second SIM card data to the terminal;
   wherein the connection is established through infrared, Bluetooth, a wireless network, a local area network or a wide area network.

8. The apparatus according to claim 7, wherein the SIM card management circuitry is further configured to access the SIM card data stored in the SIM card data storage circuitry in accordance with the request for accessing to SIM card data, when the SIM card management circuitry receives the request for accessing to SIM card data.

9. The apparatus according to claim 7, wherein the SIM card management circuitry is further configured to exchange data with a SIM card pool on the remote end according to a data exchange request and to receive information returned by the remote end, when the SIM card management circuitry receives the data exchange request.

10. The apparatus according to claim 8, further comprising:
   a data encryption and decryption circuitry, configured to decrypt the SIM card data stored in the SIM card data storage circuitry, and to encrypt SIM card data sent to the SIM card data storage circuitry, during the SIM card management circuitry accessing the SIM card data stored in the SIM card data storage circuitry.

11. An apparatus for virtualizing a SIM card, located in a network side, comprising:
   a SIM card pool data storage circuitry, configured to store SIM card data or SIM card configuration; and
   a SIM card pool management circuitry, configured to receive a request of a terminal for accessing to SIM card data on the network side, to obtain SIM card data from the SIM card pool data storage circuitry and to return the obtained SIM card data according to the request for accessing to SIM card data;
   wherein the SIM card pool management circuitry is further configured to:
   disconnect a connection between a first SIM card data and the terminal in response to a user's request for switching SIM card data from the first SIM card data to a second SIM card data; and
   connect the second SIM card data to the terminal;
   wherein the connection is established through infrared, Bluetooth, a wireless network, a local area network or a wide area network.

12. The apparatus according to claim 11, wherein the SIM card pool management circuitry is further configured to deactivate the first SIM card data stored in the SIM card pool data storage circuitry that is currently connected with the terminal, and to activate the second SIM card data stored in the SIM card pool data storage circuitry in response to receiving the user's request for switching SIM cards, so that the apparatus can disconnect the terminal from the first SIM card data and establish the connection of the terminal with the second SIM card data.

* * * * *